United States Patent
Suwa et al.

(10) Patent No.: US 12,330,134 B2
(45) Date of Patent: Jun. 17, 2025

(54) HYDROCARBON ADSORBENT

(71) Applicant: Mitsui Mining & Smelting Co., Ltd., Tokyo (JP)

(72) Inventors: Mayuko Suwa, Saitama (JP); Hidekazu Goto, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 295 days.

(21) Appl. No.: 17/911,820

(22) PCT Filed: Mar. 11, 2021

(86) PCT No.: PCT/JP2021/009753
§ 371 (c)(1),
(2) Date: Sep. 15, 2022

(87) PCT Pub. No.: WO2021/187304
PCT Pub. Date: Sep. 23, 2021

(65) Prior Publication Data
US 2023/0049498 A1 Feb. 16, 2023

(30) Foreign Application Priority Data
Mar. 19, 2020 (JP) ................................. 2020-049066

(51) Int. Cl.
*B01J 20/18* (2006.01)
*B01D 53/94* (2006.01)
(Continued)

(52) U.S. Cl.
CPC .......... *B01J 20/18* (2013.01); *B01D 53/9418* (2013.01); *B01D 53/9436* (2013.01);
(Continued)

(58) Field of Classification Search
CPC combination set(s) only.
See application file for complete search history.

(56) References Cited

U.S. PATENT DOCUMENTS

| 4,209,499 A | 6/1980 | Rubin et al. |
| 4,247,728 A * | 1/1981 | Rubin ...................... C07C 1/20 585/475 |

(Continued)

FOREIGN PATENT DOCUMENTS

| JP | 8-229387 A | 9/1996 |
| JP | 2004-105821 A | 4/2004 |

(Continued)

OTHER PUBLICATIONS

Willhammar et al., "High-Throughput Synthesis and Structure of Zeolite ZSM-43 with Two-Directional 8-Ring Channels", Inorganic Chemistry, 2017, 56, pp. 8856-8864; Cited in Japanese Office Action (JPOA) dated May 15, 2023 for JP2022-508278.

(Continued)

*Primary Examiner* — Binh Q Tran
(74) *Attorney, Agent, or Firm* — RANKIN, HILL & CLARK LLP

(57) ABSTRACT

Provided are: a hydrocarbon adsorbent capable of adsorbing hydrocarbons, storing the adsorbed hydrocarbons up to a relatively high temperature, and desorbing the adsorbed and stored hydrocarbons at a relatively high temperature; an exhaust gas purifying catalyst composition using the same; an exhaust gas purifying catalyst; and a method for treating an exhaust gas. The hydrocarbon adsorbent comprises a zeolite having an MRT-type framework structure. The hydrocarbon adsorbent comprises a small-pore zeolite having a total desorption amount $ZD_1$ of propylene desorbed at 50° C. or higher and lower than 300° C. being 3.5 mmol/g or less and a total desorption amount $ZD_2$ of propylene desorbed at 300° C. or higher and 500° C. or lower being 0.5 mmol/g or more, per 1 g by mass of the small-pore zeolite, when adsorbing propylene at 50° C. and then heating from (Continued)

50° C. to 500° C. under the condition of 10° C./min by a temperature-programmed desorption method.

17 Claims, 1 Drawing Sheet

(51) Int. Cl.
| | |
|---|---|
| *B01J 20/34* | (2006.01) |
| *C01B 39/46* | (2006.01) |
| *F01N 3/08* | (2006.01) |
| *F01N 3/20* | (2006.01) |
| *F01N 3/28* | (2006.01) |

(52) U.S. Cl.
CPC ....... *B01J 20/3408* (2013.01); *B01J 20/3483* (2013.01); *C01B 39/46* (2013.01); *B01D 2255/20761* (2013.01); *B01D 2255/912* (2013.01); *F01N 3/0828* (2013.01); *F01N 3/2066* (2013.01); *F01N 3/2803* (2013.01); *F01N 2240/18* (2013.01); *F01N 2370/04* (2013.01)

(56) References Cited

U.S. PATENT DOCUMENTS

| | | | | |
|---|---|---|---|---|
| 4,927,977 | A * | 5/1990 | Child | C07C 41/06 |
| | | | | 568/897 |
| 5,108,727 | A * | 4/1992 | Davis | B01J 29/83 |
| | | | | 423/326 |
| 5,169,614 | A * | 12/1992 | Chang | C01B 37/04 |
| | | | | 502/77 |
| 5,488,193 | A * | 1/1996 | Mackerer | C10G 29/205 |
| | | | | 585/455 |
| 2008/0083213 | A1 | 4/2008 | Tanada et al. | |
| 2016/0245207 | A1 * | 8/2016 | Ball | F01N 3/101 |
| 2019/0321783 | A1 * | 10/2019 | Yang | B01J 23/58 |
| 2023/0049498 | A1 * | 2/2023 | Suwa | B01J 20/18 |

FOREIGN PATENT DOCUMENTS

| | | |
|---|---|---|
| JP | 2007-76989 A | 3/2007 |
| JP | 2008-704 A | 1/2008 |
| JP | 2008-73625 A | 4/2008 |
| JP | 2012-206005 A | 10/2012 |
| JP | 2014-519975 A | 8/2014 |
| JP | 2018-79428 A | 5/2018 |
| JP | 2020-982 A | 1/2020 |
| WO | 2012/166868 A1 | 12/2012 |

OTHER PUBLICATIONS

"MRT: Type Material" Database of Zeolite Structures, Jan. 1, 2017, pp. 1-1, Retrieved from the Internet: URL:https://europe.iza-structure.org/IZA-S C/material_tm.php?STC=MRT [retrieved on Nov. 6, 2023]; Cited in Extended European Search Report dated Nov. 17, 2023 issued in EP21770452.7.

International Search Report (ISR) dated May 18, 2021 filed in PCT/JP2021/009753.

Westermann et al., "Impact of the Zeolite Structure and Acidity on the Adsorption of Unburnt Hydrocarbons Relevant to Cold Start Conditions", The Journal of Physical Chemistry, 2016, vol. 120, No. 45, pp. 25903-25914, total 13 pages; Cited in ISR.

\* cited by examiner

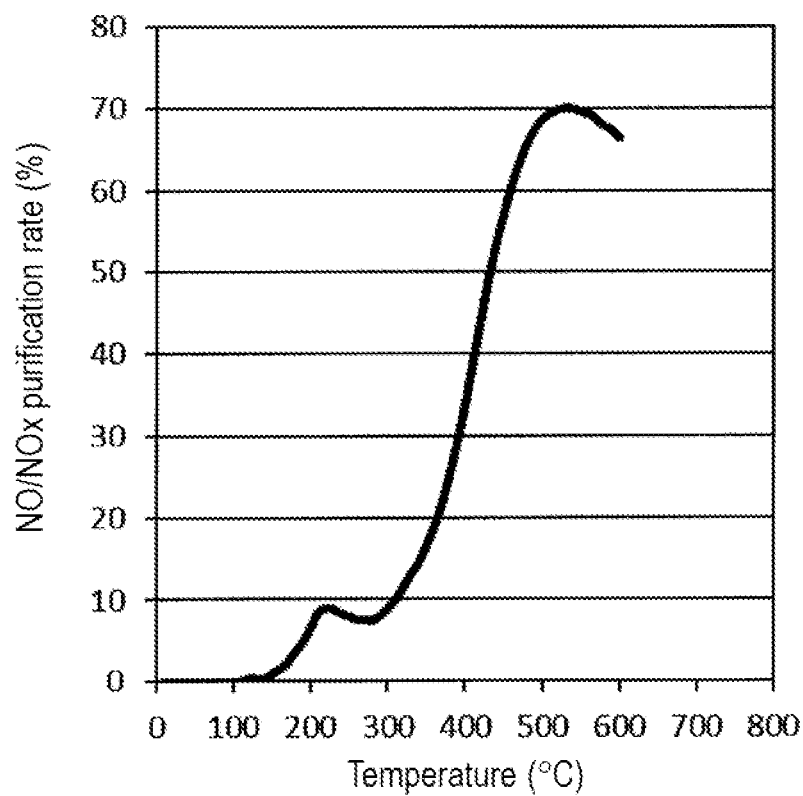

HYDROCARBON ADSORBENT

CROSS-REFERENCE TO RELATED APPLICATION

This application is a national stage entry of International Application No. PCT/JP2021/009753, filed on Mar. 11, 2021, which claims priority to Japanese Patent Application No. 2020-049066, filed on Mar. 19, 2020, the disclosures of which is hereby incorporated by reference in its entirety.

TECHNICAL FIELD

The present invention relates to a hydrocarbon adsorbent capable of adsorbing and storing hydrocarbons in exhaust gases emitted from internal combustion engines of automobiles and other vehicles.

BACKGROUND ART

Exhaust gases emitted from internal combustion engines of automobiles and other vehicles using gasoline as fuel contain harmful components such as hydrocarbons (HC) due to unburned fuel, carbon monoxide (CO) due to incomplete combustion, and nitrogen oxide (NOx) due to excessive combustion temperature. In order to treat such exhaust gases emitted from the internal combustion engines, exhaust gas purifying catalysts are used. In such exhaust gas purifying catalysts, for example, hydrocarbons (HC) are oxidized and converted into water and carbon dioxide ($CO_2$), carbon monoxide (CO) is oxidized and converted into $CO_2$, and nitrogen oxide (NOx) is reduced and converted into nitrogen for purification. For such exhaust gas purifying catalysts, for example, precious metal elements are used, and in particular, platinum group elements such as platinum (Pt), palladium (Pd), and rhodium (Rh) are used. Also, for the exhaust gas purifying catalysts, a hydrocarbon adsorbent having a performance of adsorbing and storing hydrocarbons in the exhaust gas is used as a constituent component.

Such exhaust gas purifying catalysts are known to be relatively inefficient in treating exhaust gases in low temperature environments such as in cold-start conditions of internal combustion engines. Patent Document 1 discloses a cold-start catalyst including a zeolite catalyst containing a base metal, a precious metal, and a zeolite, and a supported platinum group metal catalyst containing one or more platinum group metal and one or more inorganic oxide carriers in order to improve the efficiency of exhaust gas purification in cold-start conditions. Patent Document 1 also discloses zeolites contained in the cold-start catalyst, such as BEA-type zeolite, MFI-type zeolite, and CHA-type zeolite.

CITATION LIST

Patent Document

Patent Document 1: JP 2014-519975 W

SUMMARY OF THE INVENTION

Problem to be Solved by the Invention

The cold-start catalyst disclosed in Patent Document 1 stores hydrocarbons in a cold-start state and then desorbs the stored hydrocarbons before the catalyst is sufficiently activated when the catalyst is warmed by the inflow of high temperature exhaust gas, and thus the hydrocarbons may be emitted without being purified. Therefore, the hydrocarbon adsorbent is required to have a performance capable of adsorbing and storing hydrocarbons up to a temperature sufficient to activate the catalyst, and desorbing the adsorbed and stored hydrocarbons at the temperature at which the catalyst is activated.

Thus, the present invention is to provide a hydrocarbon adsorbent capable of adsorbing hydrocarbons, storing the adsorbed hydrocarbons up to a relatively high temperature, and desorbing the hydrocarbons at a relatively high temperature; an exhaust gas purifying catalyst composition using the same; an exhaust gas purifying catalyst; and a method for treating an exhaust gas.

Means for Solving Problem

The present invention proposes a hydrocarbon adsorbent containing a zeolite having an MRT-type framework structure.

The present invention proposes a hydrocarbon adsorbent containing a small-pore zeolite having a total desorption amount $ZD_1$ of propylene desorbed at 50° C. or higher and lower than 300° C. being 3.5 mmol/g or less and a total desorption amount $ZD_2$ of propylene desorbed at 300° C. or higher and 500° C. or lower being 0.5 mmol/g or more, per 1 g by mass of the small-pore zeolite, when adsorbing propylene at 50° C. and then heating from 50° C. to 500° C. under the condition of 10° C./min by a temperature-programmed desorption method, wherein the small-pore zeolite is the zeolite having an MRT-type framework structure.

The present invention proposes a hydrocarbon adsorbent containing a Cu-containing zeolite having a ratio ($ZD_2/ZD_1$) of a total desorption amount $ZD_2$ of propylene desorbed at 300° C. or higher and 500° C. or lower to a total desorption amount $ZD_1$ of propylene desorbed at 50° C. or higher and lower than 300° C., per 1 g by mass of the Cu-containing zeolite that contains copper, being 0.5 or more, when adsorbing propylene at 50° C. and then heating from 50° C. to 500° C. under the condition of 10° C./min by a temperature-programmed desorption method.

The present invention proposes a hydrocarbon adsorbent containing a Cu-free zeolite having a ratio ($ZD_2/ZD_1$) of a total desorption amount $ZD_2$ of propylene desorbed at 300° C. or higher and 500° C. or lower to a total desorption amount $ZD_1$ of propylene desorbed at 50° C. or higher and lower than 300° C., per 1 g by mass of the Cu-free zeolite that contains no copper, being 0.3 or more, when adsorbing propylene at 50° C. and then heating from 50° C. to 500° C. under the condition of 10° C./min by a temperature-programmed desorption method.

The present invention proposes an exhaust gas purifying catalyst composition containing the hydrocarbon adsorbent.

The present invention proposes an exhaust gas purifying catalyst including a layer containing the exhaust gas purifying catalyst composition provided on a substrate.

The present invention proposes a method for treating an exhaust gas including bringing a combustion exhaust gas containing hydrocarbons into contact with the exhaust gas purifying catalyst to adsorb the hydrocarbons to the exhaust gas purifying catalyst, and then desorbing the hydrocarbons from the exhaust gas purifying catalyst at a temperature of 300° C. or higher.

The present invention proposes a method for treating an exhaust gas including bringing a combustion exhaust gas containing NOx and/or $NH_3$ into contact with the exhaust gas purifying catalyst to selectively reduce at least a portion of NOx to $N_2$ and $H_2O$, and/or to oxidize at least a portion of $NH_3$.

Effect of the Invention

The hydrocarbon adsorbent proposed by the present invention contains a zeolite having an MRT-type framework structure, and is capable of adsorbing and storing hydrocarbons up to a relatively high temperature, and desorbing the stored hydrocarbons at a high temperature of, for example, 300° C. or higher. By the exhaust gas purifying catalyst using the hydrocarbon adsorbent and the method for treating an exhaust gas, the removal performance of hydrocarbons can be improved.

BRIEF DESCRIPTION OF DRAWINGS

FIG. 1 is a graph showing the relationship between temperatures and NO/NOx purification rates of an exhaust gas purifying catalyst in Example 3.

MODE(S) FOR CARRYING OUT THE INVENTION

Next, the present invention will be described on the basis of embodiments. However, the present invention is not limited to the embodiments described below.

An example of the embodiments of the present invention is a hydrocarbon adsorbent containing an MRT-type zeolite. The hydrocarbon adsorbent contains an MRT-type zeolite, resulting in adsorbing hydrocarbons at a relatively low temperature of, for example, approximately 50° C., storing the hydrocarbons up to a relatively high temperature of, for example, 300° C. or higher, particularly preferably 380° C. or higher, and desorbing the stored hydrocarbons at a relatively high temperature of higher than 300° C. The MRT-type zeolite is a zeolite having an MRT structure. The zeolite has a crystalline or quasi-crystalline aluminosilicate crystal structure composed of repeating units of $SiO_4$ and $AlO_4$ tetrahedrons. The framework structure of the zeolite is given a structural code of three uppercase letters of the alphabet defined by the International Zeolite Association. This structure can be confirmed according to the Database of Zeolite Structures by the Structure Commission of the International Zeolite Association.

The MRT-type zeolite has a structure in which 8-, 6-, and 4-membered rings are three-dimensionally continuous. The crystal structure of the MRT-type zeolite belongs to the orthorhombic crystal system and Pmma space group. A typical MRT-type zeolite has a lattice constant a, which indicates the length of the axis of the unit lattice, of 13.6207 angstroms (a=13.6207 Å), a lattice constant b of 7.5466 angstroms (b=7.5466 Å), a lattice constant c of 13.6219 angstroms (c=13.6219 Å), and $\alpha$, $\beta$, and $\gamma$, which indicate the angles between the axes of the unit lattice, of 90° ($\alpha$=90.000°, $\beta$=90.000°, and $\gamma$=) 90.000° respectively. The crystal structure of the zeolite can be referred to the Database of Zeolite Structures by the Structure Commission of the International Zeolite Association.

The molar ratio of $SiO_2/Al_2O_3$ in the MRT-type zeolite is preferably 13 or more, may be 50 or less, may be 40 or less, may be 30 or less, may be 25 or less, and may be 20 or less. When the molar ratio of $SiO_2/Al_2O_3$ in the MRT-type zeolite is 13 or more, the MRT-type zeolite has a stable crystal structure and excellent heat resistance. When the molar ratio of $SiO_2/Al_2O_3$ in the MRT-type zeolite is 50 or less, Al forming a Bronsted acid point, which is an active point for oxidation of hydrocarbons (HC), is sufficiently contained, and the hydrocarbons (HC) can be desorbed and then oxidized to improve the purification performance. The molar ratio of $SiO_2/Al_2O_3$ contained in the MRT-type zeolite or the exhaust gas purifying composition described later can be obtained by measuring the Si amount and the Al amount by elemental analysis using, for example, a scanning fluorescent X-ray analyzer (ZSX Primus II, manufactured by Rigaku Corp.).

The MRT-type zeolite preferably contains at least one element selected from the group consisting of hydrogen, transition metal elements, alkali metal elements, and alkaline earth metal elements. When the MRT-type zeolite contains at least one element selected from the group consisting of hydrogen, transition metal elements, alkali metal elements, and alkaline earth metal elements, the hydrocarbon adsorbent containing the MRT-type zeolite adsorbs hydrocarbons at a relatively low temperature of, for example, approximately 50° C., stores the hydrocarbons up to a relatively high temperature of, for example, 300° C. or higher, and desorbs the hydrocarbons at a relatively high temperature of, for example, higher than 300° C. Examples of the transition metal elements contained in the MRT-type zeolite include at least one element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), technetium (Tc), and ruthenium (Ru); and at least one element selected from the group consisting of Mn, Fe, Co, Ni, Cu, and Zn is preferred. Preferred examples of the alkali metal elements contained in the MRT-type zeolite include at least one element selected from the group consisting of lithium (Li), sodium (Na), potassium (K), rubidium (Rb), and cesium (Cs). Preferred examples of the alkaline earth metal elements contained in the MRT-type zeolite include at least one element selected from the group consisting of magnesium (Mg), calcium (Ca), strontium (Sr), and barium (Ba).

The MRT-type zeolite preferably contains at least one element M selected from the group consisting of hydrogen, manganese, iron, cobalt, nickel, copper, zinc, potassium, rubidium, cesium, strontium, and barium. The MRT-type zeolite more preferably contains at least one element selected from the group consisting of hydrogen, manganese, iron, cobalt, nickel, copper, zinc, potassium, and cesium, and may contain two or more types of these. When the MRT-type zeolite contains at least one element selected from the group consisting of hydrogen, manganese, iron, cobalt, nickel, copper, zinc, potassium, rubidium, cesium, strontium, and barium, the MRT-type zeolite adsorbs hydrocarbons and stores the hydrocarbons up to higher temperatures.

When the MRT-type zeolite contains one metal element M selected from the group consisting of transition metal elements, alkali metal elements, and alkaline earth metal elements, and the metal element M contained in the MRT-type zeolite is an n-valent cation, the molar ratio (M/Al) of the metal element M to Al is preferably in a range of 0.01 or more and 6.0/n (n-valence) or less, more preferably in a range of 0.02 or more and 3.0/n (n-valence) or less, and even more preferably in a range of 0.03 or more and 1.0/n (n-valence) or less. When plural metal species (Mx1, Mx2, . . . ) are contained, the total value (Mx1/Al+ Mx2/Al+ . . . ) of the molar ratio of each metal element (Mx1, Mx2, . . . ) to Al is preferably 6.0 or less, more preferably 3.0 or less, and even more preferably not more than 1.0. The metal element M may be contained in the MRT-type zeolite in the form of a single metal and/or an oxide.

The content ratio of the metal element M in the MRT-type zeolite is preferably 0.3% by mass or more and 10% by mass or less, more preferably 1% by mass or more and 7% by mass or less, and even more preferably 2% by mass or more and 6% by mass or less, relative to the mass of the MRT-type zeolite, in terms of the oxide of the metal element M. The amounts of the element M and Al contained in the MRT-type zeolite or the exhaust gas purifying composition described later can be measured by elemental analysis using, for example, a scanning fluorescent X-ray analyzer (ZSX Primus II, manufactured by Rigaku Corp.).

In an example of the embodiments of the present invention, the zeolite contained in the hydrocarbon adsorbent may be a small-pore zeolite. The small-pore zeolite refers to a zeolite having a framework in which the largest pore is an oxygen 8-membered ring. The small-pore zeolite may be a zeolite having an MRT-type framework structure. The small-pore zeolite may also be a zeolite having a CHA-type framework structure. The small-pore zeolite preferably contains at least one element selected from the group consisting of hydrogen, transition metal elements, alkali metal elements, and alkaline earth metal elements. The small-pore zeolite more preferably contains at least one element M selected from the group consisting of hydrogen, manganese, iron, cobalt, nickel, copper, zinc, potassium, rubidium, cesium, strontium, and barium.

The small-pore zeolite preferably has a total desorption amount $ZD_1$ of propylene desorbed at 50° C. or higher and lower than 300° C. being 3.5 mmol/g or less and a total desorption amount $ZD_2$ of propylene desorbed at 300° C. or higher and 500° C. or lower being 0.5 mmol/g or more, per 1 g by mass of the small-pore zeolite, when adsorbing propylene at 50° C. and then heating from 50° C. to 500° C. at a temperature rising rate of 10° C./min by a temperature-programmed desorption method. The desorption amount $ZD_1$ is more preferably 2.5 mmol/g or less, even more preferably 1.5 mmol/g or less, particularly preferably 1.2 mmol/g or less, and most preferably 1.0 mmol/g or less, from the viewpoint that the zeolite retains hydrocarbons up to higher temperatures. The desorption amount $ZD_2$ is more preferably 0.8 mmol/g or more, and even more preferably 1.0 mmol/g or more, from the viewpoint that the zeolite retains more hydrocarbons at high temperatures.

In an example of the embodiments of the present invention, in the case where the zeolite contained in the hydrocarbon adsorbent is a Cu-containing zeolite that contains copper, the zeolite preferably has a ratio ($ZD_2/ZD_1$) of a total desorption amount $ZD_2$ of propylene desorbed at 300° C. or higher and 500° C. or lower to a total desorption amount $ZD_1$ of propylene desorbed at 50° C. or higher and lower than 300° C. being 0.5 or more, when adsorbing propylene at 50° C. and then heating from 50° C. to 500° C. by a temperature-programmed desorption method. When the zeolite contains copper (Cu), the desorption temperature for desorbing hydrocarbons from the hydrocarbon adsorbent can be increased. The desorption amount ratio ($ZD_2/ZD_1$) is more preferably 1.0 or more and 4.0 or less, even more preferably 1.0 or more and 3.0 or less, particularly preferably 1.0 or more and 2.0 or less, and most preferably 1.3 or more and 1.6 or less, from the viewpoint that the zeolite retains more hydrocarbons at high temperatures. The zeolite is preferably an MRT-type zeolite. The Cu-containing zeolite may be an MRT-type zeolite. The Cu-containing zeolite may be a small-pore zeolite. The Cu-containing zeolite preferably contains at least one element selected from the group consisting of hydrogen, transition metal elements excluding Cu, alkali metal elements, and alkaline earth metal elements. The Cu-containing zeolite more preferably contains at least one element Ml selected from the group consisting of hydrogen, manganese, iron, cobalt, nickel, zinc, potassium, rubidium, cesium, strontium, and barium, in addition to a copper element.

In an example of the embodiments of the present invention, in the case where the zeolite contained in the hydrocarbon adsorbent is a Cu-free zeolite that contains no copper, the zeolite preferably has a ratio ($ZD_2/ZD_1$) of the desorption amount of propylene being 0.3 or more. The desorption amount ratio ($ZD_2/ZD_1$) is more preferably 0.3 or more and 1.5 or less, even more preferably 0.3 or more and 1.0 or less, particularly preferably 0.32 or more and 1.0 or less, and most preferably 0.34 or more and 0.5 or less, from the viewpoint that the zeolite retains more hydrocarbons at high temperatures. The zeolite is preferably an MRT-type zeolite. The MRT-type zeolite preferably contains at least one element selected from the group consisting of hydrogen, transition metal elements, alkali metal elements, and alkaline earth metal elements; more preferably contains at least one element M selected from the group consisting of hydrogen, manganese, iron, cobalt, nickel, copper, zinc, rubidium, cesium, strontium, and barium; even more preferably contains at least one element selected from the group consisting of hydrogen, manganese, iron, cobalt, nickel, copper, zinc, and cesium; and may contain two or more elements of these. The Cu-free zeolite may be an MRT-type zeolite. The Cu-free zeolite may be a small-pore zeolite. The Cu-free zeolite preferably contains at least one element selected from the group consisting of hydrogen, transition metal elements excluding Cu, alkali metal elements, and alkaline earth metal elements. The Cu-free zeolite more preferably contains at least one element selected from the group consisting of hydrogen, manganese, iron, cobalt, nickel, zinc, potassium, rubidium, cesium, strontium, and barium. The Cu-free zeolite refers to a zeolite that contains substantially no copper. The zeolite that contains substantially no copper refers to a zeolite having a copper content of 0.01% by mass or less relative to the total amount.

The desorption amount $ZD_1$ and the desorption amount $ZD_2$ of propylene desorbed from the zeolite can be measured by, for example, the following measurement method and measurement conditions.

Measurement Method

Using a catalyst evaluation apparatus (BELCAT, manufactured by MicrotracBEL Corp.) as a flow reactor, a predetermined amount of a sample is filled in a reaction tube of the flow reactor, and the sample is adsorbed with propylene while circulating an evaluation gas containing propylene through the reaction tube at 50° C. and 20 ml/min for 30 minutes, followed by heating from 50° C. to 500° C. at a temperature rising rate of 10° C./min by a temperature-programmed desorption method to desorb propylene. For the measurement of the thermal desorption of propylene adsorbed on the zeolite, an online gas analysis system (BELMass, manufactured by MicrotracBEL Corp.) can be used, and for the measurement of the total amount of propylene desorbed at 300° C. or higher, ChemMaster (manufactured by MicrotracBEL Corp.) can be used.

Measurement Conditions

Evaluation gas: 0.5% by volume of propylene and 99.5% by volume of helium

An example of the embodiments of the present invention is an exhaust gas purifying catalyst composition containing the above-mentioned hydrocarbon adsorbent. The exhaust gas purifying catalyst composition may contain the above-mentioned hydrocarbon adsorbent and other components such as one or more elements selected from the group consisting of typical metal elements and transition metal elements (hereinafter may be referred to as "specific elements"). The transition metal element may be at least one selected from the group consisting of precious metals such as copper (Cu), ruthenium (Ru), rhodium (Rh), palladium (Pd), silver (Ag), rhenium (Re), osmium (Os), iridium (Ir), platinum (Pt), and gold (Au). The transition metal element may be at least one catalytically active element selected from the platinum group consisting of ruthenium, rhodium, palladium, osmium, iridium and platinum; and is more preferably at least one catalytically active element selected from the group consisting of rhodium, palladium, and platinum. The specific elements contained in the exhaust gas purifying catalyst may be contained in the exhaust gas purifying catalyst composition using a compound containing these elements, such as nitrate, as raw materials. The specific elements may be contained in an inorganic oxide carrier, and the typical metal elements or the transition metal elements contained in the inorganic oxide carrier may be at least one element selected from the group consisting of Group 2, Group 3, Group 4, Group 5, Group 13, and Group 14 elements. Examples of the inorganic oxide carrier may include alumina ($Al_2O_3$), silica ($SiO_2$), zirconia ($ZrO_2$), ceria ($CeO_2$), niobium oxide ($Nb_2O_5$), tantalum oxide ($Ta_2O_3$), molybdenum oxide ($MoO_3$), tungsten oxide ($WO_3$), and any mixed or composite oxide of these, such as silica-alumina, ceria-zirconia, or alumina-ceria-zirconia.

The exhaust gas purifying catalyst composition can be produced by any known method. For example, a compound containing specific elements can be brought into contact with a zeolite contained in the hydrocarbon adsorbent to attach the specific elements on the zeolite. Alternatively, a compound containing specific elements may be brought into contact with an inorganic oxide carrier to obtain an inorganic oxide carrier on which the specific elements are supported, and the zeolite may be brought into contact with the inorganic oxide carrier to attach the inorganic oxide carrier on which the catalytic activity is supported on the zeolite. Examples of the method for attaching specific elements to the zeolite include a vapor deposition method, an impregnation method, a precipitation method, and an ion exchange method. Examples of the vapor deposition method include a method of placing a zeolite and a compound containing specific elements into a container, and evaporating the compound containing the elements at room temperature or by heating to attach the compound containing the elements on the zeolite. Examples of the impregnation method include a method of immersing a zeolite into a solution obtained by mixing the compound containing the elements with a solvent, and heating and drying the mixed solution under normal pressure or reduced pressure to attach the compound containing the elements on the zeolite. Examples of the impregnation method include an incipient wetness method, an evaporation-drying method, a pore-filling method, a spraying method, and an equilibrium adsorption method. Examples of the precipitation method include a kneading method and a deposition method. The zeolite on which the compound containing the elements is attached may be dried at a temperature of, for example, 80° C. or higher and 150° C. or lower; the drying time may be in a range of 0.5 hour or more and 5 hours or less; the pressure in drying is not particularly limited, and may be an atmospheric pressure (0.1 MPa) or under a reduced pressure of 0.1 MPa or less. The zeolite on which the elements are attached may be dried and further heat-treated as necessary. The heat treatment temperature may be in a range of 200° C. or higher and 800° C. or lower, and may be in a range of 400° C. or higher and 700° C. or lower, in order to prevent pores of the zeolite from being damaged.

An example of the embodiments of the present invention is an exhaust gas purifying catalyst including a layer containing the above-mentioned exhaust gas purifying catalyst composition.

As the substrate, a known exhaust gas catalyst substrate can be used. Examples of the material of the substrate include ceramics and metals. Examples of the ceramic substrate include refractory ceramic materials such as cordierite, hydrocarbons, mullite, silica-alumina, and alumina. Examples of the metallic substrate include refractory metals such as stainless steel. As for the shape of the substrate, for example, those having numerous cells serving as fine flow passages parallel to each other inside the substrate, such as a honeycomb-shaped substrate can be used. Examples of such substrate shapes include a wall-flow-type substrate and a flow-through-type substrate.

The exhaust gas purifying catalyst can be produced by preparing a slurried exhaust gas purifying catalyst composition, coating the slurried exhaust gas purifying catalyst composition on a substrate, drying the resulting product as necessary, and calcining the resulting product to form a layer containing the exhaust gas purifying catalyst composition. The slurried exhaust gas purifying catalyst composition can be produced by mixing and stirring an MRT-type zeolite, an element serving as a catalytic active component, a NOx storage material, a catalyst carrier, and optionally a stabilizer, a binder, other components, and water. As the binder, an inorganic binder, for example, a water-soluble solution such as an alumina sol can be used. When the exhaust gas purifying catalyst includes an oxidation catalyst layer, a NOx storage layer, and a reduction catalyst layer, an exhaust gas purifying catalyst composition containing an MRT-type zeolite and a catalytic active element necessary for catalytic activity of each layer can be used for the exhaust gas purifying catalyst composition constituting each layer.

The exhaust gas purifying catalyst can also be used in a selective catalytic reduction (SCR) system. The selective catalytic reduction (SCR) is capable of reducing NOx to $N_2$ by reacting with a nitrogen compound such as ammonia or urea, or with hydrocarbons.

The exhaust gas purifying catalyst can be used for purifying exhaust gases emitted from internal combustion engines using fuel as a power source, such as gasoline engines and diesel engines, and is capable of adsorbing and storing hydrocarbons up to relatively high temperatures, resulting in improving removal performance of hydrocarbons and reduction performance of NOx.

An example of the embodiments of the present invention is a method for treating an exhaust gas including bringing a combustion exhaust gas containing hydrocarbons into contact with the above-mentioned exhaust gas purifying catalyst to adsorb the hydrocarbons to the exhaust gas purifying catalyst, and then desorbing the hydrocarbons from the exhaust gas purifying catalyst at a temperature of 300° C. or higher. The exhaust gas purifying catalyst is capable of desorbing hydrocarbons adsorbed and stored at a high temperature of 300° C. or higher. By the exhaust gas purifying catalyst using the hydrocarbon adsorbent and the method for treating an exhaust gas, the removal performance of hydrocarbons can be improved.

An example of the embodiments of the present invention is a method for treating an exhaust gas including bringing a combustion exhaust gas containing NOx and/or $NH_3$ into contact with the exhaust gas purifying catalyst to selectively reduce at least a portion of NOx to $N_2$ and $H_2O$, and/or to oxidize a portion of $NH_3$. The exhaust gas purifying catalyst can be used in, for example, a selective catalytic reduction (SCR) system, and brought into contact with a combustion gas containing NOx and/or $NH_3$ to efficiently reduce NOx to $N_2$ and $H_2O$, thereby removing NOx from the exhaust gas.

EXAMPLES

Hereinafter, the present invention will be further described in detail based on Examples and Comparative Examples. The present invention is not limited to the following Examples.

Production of MRT-Type Zeolite

Deionized water (pure water), potassium hydroxide, aluminum hydroxide, cesium hydroxide, choline bromide ((2-hydroxyethyl)trimethylammonium bromide), and colloidal silica (LUDOX (registered trademark) AS-40, manufactured by Sigma-Aldrich Japan) were prepared, and these were mixed to obtain a raw material composition having a composition with the following molar ratios of the raw materials.

Molar ratio of $SiO_2/Al_2O_3$=13
K/Si=0.28
Cs/Si=0.14
Molar ratio of choline bromide/Si=0.42
Molar ratio of $H_2O$/Si=20

The resulting raw material composition was filled into a sealed container and crystallized by heating at 150° C. for 20 days in a static state. The crystallized raw material composition was subjected to solid-liquid separation, and washed with deionized water to recover the crystal. The resulting crystal was dried at 100° C. for 8 hours, and heat-treated at 600° C. for 1 hour in an atmospheric atmosphere to obtain an MRT-type zeolite. Whether or not the resulting zeolite was an MRT-type zeolite was confirmed by measuring using a powder X-ray diffractometer.

The resulting MRT-type zeolite had a composition with the following molar ratios of the components.

Molar ratio of $SiO_2/Al_2O_3$=15
K/Al=0.13
Cs/Al=0.15

Example 1

Production of Hydrocarbon Adsorbent

The resulting MRT-type zeolite in an amount of 1 g was immersed in 10 g of 0.1 mol/L ammonium chloride aqueous solution at 60° C., subjected to solid-liquid separation, and washed with deionized water to obtain an $NH_4$-type MRT-type zeolite. The resulting $NH_4$-type MRT-type zeolite in an amount of 1 g was immersed in 10 g of 0.05 mol/L copper acetate (II) aqueous solution at 60° C., subjected to solid-liquid separation, and washed with deionized water to recover a wet powder. The resulting wet powder was dried at 100° C. for 8 hours, and heat-treated at 550° C. for 3 hours in an atmospheric atmosphere to obtain an MRT-type zeolite containing Cu. The resulting MRT-type zeolite containing Cs and Cu was used as a hydrocarbon adsorbent. The MRT-type zeolite used as a hydrocarbon adsorbent had a composition with the following molar ratios of the components. The hydrocarbon adsorbent in Example 1 contained an MRT-type zeolite; and the MRT-type zeolite was a small-pore zeolite having a framework in which the largest pore was an oxygen 8-membered ring, and was a Cu-containing zeolite.

Molar ratio of $SiO_2/Al_2O_3$=13
K/Al=0.02
Cs/Al=0.05
Cu/Al=0.06

Example 1-2

The resulting MRT-type zeolite in an amount of 1 g was immersed in 10 g of 0.1 mol/L ammonium chloride aqueous solution at 60° C., subjected to solid-liquid separation, and washed with deionized water to obtain an $NH_4$-type MRT-type zeolite. The resulting $NH_4$-type MRT-type zeolite in an amount of 1 g was immersed in 6 g of 1 N hydrochloric acid, subjected to solid-liquid separation, and washed with deionized water to obtain an H-type MRT-type zeolite. The resulting H-type MRT-type zeolite in an amount of 1 g was immersed in 10 g of 0.05 mol/L copper acetate (II) aqueous solution at 60° C., subjected to solid-liquid separation, and washed with deionized water to recover a wet powder. The resulting wet powder was dried at 100° C. for 8 hours, and heat-treated at 550° C. for 3 hours in an atmospheric atmosphere to obtain an MRT-type zeolite having the following composition. The hydrocarbon adsorbent in Example 1-2 contained an MRT-type zeolite; and the MRT-type zeolite was a small-pore zeolite having a framework in which the largest pore was an oxygen 8-membered ring, and was a Cu-containing zeolite.

Ratio of $SiO_2/Al_2O_3$=13
K/Al=0.0
Cs/Al=0.08
Cu/Al=0.13

Example 1-3

An MRT-type zeolite having the following composition was obtained in the same manner as in Example 1-2, except that 0.1 mol/L copper acetate (II) aqueous solution was used. The hydrocarbon adsorbent in Example 1-3 contained an MRT-type zeolite, and the MRT-type zeolite was a small-pore zeolite having a framework in which the largest pore was an oxygen 8-membered ring, and was a Cu-containing zeolite.

Ratio of $SiO_2/Al_2O_3$=13
K/Al=0.0
Cs/Al=0.09
Cu/Al=0.15

Example 1-4

An MRT-type zeolite having the following composition was obtained in the same manner as in Example 1-2, except that 0.15 mol/L copper acetate (II) aqueous solution was used. The hydrocarbon adsorbent in Example 1-4 contained an MRT-type zeolite, and the MRT-type zeolite was a small-pore zeolite having a framework in which the largest pore was an oxygen 8-membered ring, and was a Cu-containing zeolite.

Ratio of $SiO_2/Al_2O_3$=13
K/Al=0.0
Cs/Al=0.09
Cu/Al=0.17

Example 1-5

The resulting MRT-type zeolite in an amount of 1 g was immersed in 10 g of 0.1 mol/L ammonium chloride aqueous solution at 60° C., subjected to solid-liquid separation, and washed with deionized water to obtain an $NH_4$-type MRT-type zeolite. The resulting $NH_4$-type MRT-type zeolite in an amount of 1 g was immersed in 6 g of 1N hydrochloric acid, subjected to solid-liquid separation, and washed with deionized water to obtain an H-type MRT-type zeolite. The resulting H-type MRT-type zeolite in an amount of 1 g was impregnated into 1 g of 0.2 mol/L copper acetate (II) aqueous solution to obtain an MRT-type zeolite containing Cu having the following composition by a pore-filling method. The hydrocarbon adsorbent in Example 1-5 contained an MRT-type zeolite, and the MRT-type zeolite was a small-pore zeolite having a framework in which the largest pore was an oxygen 8-membered ring, and was a Cu-containing zeolite.

Ratio of $SiO_2/Al_2O_3$=13
K/Al=0.02
Cs/Al=0.11
Cu/Al=0.23

Example 1-6

The MRT-type zeolite obtained in Example 2-2 described later in an amount of 1 g was immersed in 10 g of 0.05 mol/L copper acetate (II) aqueous solution at 60° C., subjected to solid-liquid separation, and washed with deionized water to recover a wet powder. The resulting wet powder was dried at 100° C. for 8 hours, and heat-treated at 550° C. for 3 hours in an atmospheric atmosphere to obtain an MRT-type zeolite containing Cu having the following composition. The hydrocarbon adsorbent in Example 1-6 contained an MRT-type zeolite, and the MRT-type zeolite was a small-pore zeolite having a framework in which the largest pore was an oxygen 8-membered ring, and was a Cu-containing zeolite.

Ratio of $SiO_2/Al_2O_3$=14
K/Al=0.0
Cs/Al=0.03
Cu/Al=0.18

Example 1-7

An MRT-type zeolite containing Cu having the following composition was obtained in the same manner as in Example 1-6, except that 0.15 mol/L copper acetate (II) aqueous solution was used. The hydrocarbon adsorbent in Example 1-7 contained an MRT-type zeolite, and the MRT-type zeolite was a small-pore zeolite having a framework in which the largest pore was an oxygen 8-membered ring, and was a Cu-containing zeolite.

Ratio of $SiO_2/Al_2O_3$=15
Cs/Al=0.0
Cu/Al=0.13

Example 2

The resulting MRT-type zeolite in an amount of 1 g was immersed in 10 g of 0.1 mol/L ammonium chloride aqueous solution at 60° C., subjected to solid-liquid separation, and washed with deionized water to obtain an $NH_4$-type MRT-type zeolite. The resulting $NH_4$-type MRT-type zeolite in an amount of 1 g was immersed in 6 g of 1 N hydrochloric acid, subjected to solid-liquid separation, and washed with deionized water to obtain an H-type MRT-type zeolite in a wet state. The resulting H-type MRT-type zeolite was dried at 100° C. for 8 hours, and heat-treated at 550° C. for 3 hours in an atmospheric atmosphere to obtain an H-type MRT-type zeolite containing Cs. The resulting H-type MRT-type zeolite containing Cs was used as a hydrocarbon adsorbent. The MRT-type zeolite used as a hydrocarbon adsorbent had a composition with the following molar ratios of the components. The MRT-type zeolite used as the hydrocarbon adsorbent in Example 2 was a small-pore zeolite having a framework in which the largest pore was an oxygen 8-membered ring, and was a Cu-free zeolite. The MRT-type zeolite used as the hydrocarbon adsorbent in Example 2 contained substantially no copper.

Molar ratio of $SiO_2/Al_2O_3$=13
K/Al=0
Cs/Al=0.28

Comparative Example 1

An H-type CHA-type zeolite having a molar ratio of $SiO_2/Al_2O_3$ being 10 was used as a hydrocarbon adsorbent.

Comparative Example 2

A CHA-type zeolite (SAR=10) in an amount of 1 g was immersed in 10 g of 0.1 mol/L ammonium chloride aqueous solution at 60° C., subjected to solid-liquid separation, and washed with deionized water to obtain an $NH_4$-type CHA-type zeolite. The resulting $NH_4$-type CHA-type zeolite in an amount of 1 g was immersed in 10 g of 0.05 mol/L copper acetate (II) aqueous solution at 60° C., subjected to solid-liquid separation, and washed with deionized water to recover a wet powder. The resulting wet powder was dried at 100° C. for 8 hours, and heat-treated at 550° C. for 3 hours in an atmospheric atmosphere to obtain a CHA-type zeolite containing Cu. The resulting CHA-type zeolite containing Cu was used as a hydrocarbon adsorbent. The CHA-type zeolite used as a hydrocarbon adsorbent had a composition with the following molar ratios of the components. The CHA-type zeolite used as the hydrocarbon adsorbent in Comparative Example 2 was a small-pore zeolite having a framework in which the largest pore was an oxygen 8-membered ring, and was a Cu-containing zeolite.

Molar ratio of $SiO_2/Al_2O_3$=10
Cu/Al=0.30

Example 2-2

The resulting MRT-type zeolite in an amount of 1 g was immersed in 10 g of 0.1 mol/L ammonium chloride aqueous solution at 60° C., subjected to solid-liquid separation, and washed with deionized water to obtain an $NH_4$-type MRT-type zeolite. The resulting $NH_4$-type MRT-type zeolite in an amount of 1 g was immersed in 6 g of 1 N hydrochloric acid, subjected to solid-liquid separation, and washed with deionized water to obtain an H-type MRT-type zeolite in a wet state. The resulting H-type MRT-type zeolite in an amount of 1 g was immersed in 10 g of 0.1 M sulfuric acid at 80° C., subjected to solid-liquid separation, and washed with deionized water to recover a wet powder. The resulting wet powder was dried at 80° C. for 12 hours to obtain an MRT-type zeolite having the following composition. The hydrocarbon adsorbent in Example 2-2 contained an MRT-type zeolite, and the MRT-type zeolite was a small-pore zeolite having a framework in which the largest pore was an oxygen 8-membered ring, and was a Cu-free zeolite. The MRT-type zeolite used as the hydrocarbon adsorbent in Example 2-2 contained substantially no copper.

Molar ratio of $SiO_2/Al_2O_3$=14
K/Al=0
Cs/Al=0.08

Example 2-3

An MRT-type zeolite having the following composition was obtained in the same manner as in Example 2-2, except that 5 M sulfuric acid was used. The hydrocarbon adsorbent in Example 2-3 contained an MRT-type zeolite, and the MRT-type zeolite was a small-pore zeolite having a framework in which the largest pore was an oxygen 8-membered ring, and was a Cu-free zeolite. The MRT-type zeolite used as the hydrocarbon adsorbent in Example 2-3 contained substantially no copper.
Molar ratio of $SiO_2/Al_2O_3$=15
K/Al=0
Cs/Al=0.03

Comparative Example 3

A CHA-type zeolite (SAR=10) in an amount of 1 g was immersed in 10 g of 0.1 mol/L ammonium chloride aqueous solution at 60° C., subjected to solid-liquid separation, and washed with deionized water to obtain an $NH_4$-type CHA-type zeolite. The resulting $NH_4$-type CHA-type zeolite in an amount of 1 g was immersed in 30 g of 0.05 mol/L cesium acetate aqueous solution, subjected to solid-liquid separation, and washed with deionized water to recover a wet powder. The resulting wet powder was dried at 100° C. for 8 hours, and heat-treated at 550° C. for 3 hours in an atmospheric atmosphere to obtain a CHA-type zeolite containing Cs. The resulting CHA-type zeolite containing Cs was used as a hydrocarbon adsorbent. The CHA-type zeolite used as a hydrocarbon adsorbent had a composition with the following molar ratios of the components. The CHA-type zeolite used as the hydrocarbon adsorbent in Comparative Example 3 was a small-pore zeolite having a framework in which the largest pore was an oxygen 8-membered ring, and was a Cu-free zeolite. The CHA-type zeolite used as the hydrocarbon adsorbent in Comparative Example 3 contained substantially no copper.
Molar ratio of $SiO_2/Al_2O_3$=10
Cs/Al=0.07

Comparative Example 4

An H-type BEA-type zeolite (product name: CZB30, manufactured by Clariant AG) was used as a hydrocarbon adsorbent.

Comparative Example 5

An H-type MFI-type zeolite (product name: HSZ840HOA, manufactured by Tosoh Corp.) was used as a hydrocarbon adsorbent.
Preparation of Measurement Sample
The raw material composition or each zeolite was filled into a vinyl chloride pipe having a diameter of 30 mm, and compression-molded to prepare a measurement sample.
Molar Ratio of $SiO_2/Al_2O_3$
Using a scanning fluorescent X-ray analyzer (ZSX Primus II, manufactured by Rigaku Corp.), the Si and Al amounts in the measurement sample were measured by elemental analysis, and the molar ratio of $SiO_2/Al_2O_3$ was calculated from the measured Si and Al amounts.
Molar Ratio of Cs/Al
Using the above-mentioned scanning fluorescent X-ray analyzer, the Cs and Al amounts in the measurement sample were measured by elemental analysis to calculate the molar ratio of Cs/Al.
Molar Ratio of Cu/Al
Using the above-mentioned scanning fluorescent X-ray analyzer, the Cu and Al amounts in the measurement sample were measured by elemental analysis to calculate the molar ratio of Cu/Al.
Propylene Desorption Amount Obtained by Temperature-Programmed Desorption Method and Desorption Amount Ratio
The hydrocarbon adsorbent in each of Examples and Comparative Examples was used as an exhaust gas purifying composition. The exhaust gas purifying composition (hydrocarbon adsorbent) in each of Examples and Comparative Examples was adsorbed with propylene at 50° C. Thereafter, it was heated from 50° C. to 500° C. by a temperature-programmed desorption method, and the desorption temperature of propylene was measured.
Specifically, using a catalyst evaluation apparatus (BEL-CAT, manufactured by MicrotracBEL Corp.) as a flow reactor, the measurement sample was filled in a reaction tube of the flow reactor, and the sample was adsorbed with propylene while circulating an evaluation gas containing propylene through the reaction tube at 50° C. and 20 ml/min for 30 minutes, followed by heating from 50° C. to 500° C. at a temperature rising rate of 10° C./min by a temperature-programmed desorption method to desorb propylene. For the measurement of the thermal desorption of propylene adsorbed on the zeolite, an on-line gas analysis system (BELMass, manufactured by MicrotracBEL Corp.) and ChemMaster (manufactured by MicrotracBEL Corp.) were used. The total desorption amount $ZD_1$ (mmol/g) of propylene desorbed at 50° C. or higher and lower than 300° C. per 1 g of the zeolite and the total desorption amount $ZD_2$ (mmol/g) of propylene desorbed at 300° C. or higher and 500° C. or lower per 1 g of the zeolite were measured, and the desorption amount ratio ($ZD_2/ZD_1$) of the desorption amount $ZD_1$ to the desorption amount $ZD_2$ was calculated. The temperature at the peak top in the curve of the graph showing the relationship between the temperature and the propylene desorption amount for each measurement sample was defined as the propylene retention temperature. When there were plural peaks, the temperature at the peak top on the higher temperature side was defined as the retention temperature.
The results are shown in Tables 1 to 3.
Measurement Conditions
Evaluation gas: 0.5% by volume of propylene and 99.5% by volume of helium

TABLE 1

|  | Framework structure | Largest pore | Contained element | Total desorption amount of propylene desorbed at 50° C. or higher and lower than 300° C. $ZD_1$ (mmol/g) | Total desorption amount of propylene desorbed at 300° C. or higher and 500° C. or lower $ZD_2$ (mmol/g) |
|---|---|---|---|---|---|
| Example 1 | MRT | 8-membered ring | Cu, Cs | 0.83 | 1.19 |
| Example 1-2 | MRT | 8-membered ring | Cu, Cs | 0.62 | 1.49 |
| Example 1-3 | MRT | 8-membered ring | Cu, Cs | 0.51 | 1.40 |
| Example 1-4 | MRT | 8-membered ring | Cu, Cs | 0.57 | 1.75 |

TABLE 1-continued

| | Framework structure | Largest pore | Contained element | Total desorption amount of propylene desorbed at 50° C. or higher and lower than 300° C. $ZD_1$ (mmol/g) | Total desorption amount of propylene desorbed at 300° C. or higher and 500° C. or lower $ZD_2$ (mmol/g) |
|---|---|---|---|---|---|
| Example 1-5 | MRT | 8-membered ring | Cu, Cs | 0.41 | 1.49 |
| Example 1-6 | MRT | 8-membered ring | Cu, Cs | 0.50 | 1.33 |
| Example 1-7 | MRT | 8-membered ring | Cu | 0.52 | 1.37 |
| Example 2 | MRT | 8-membered ring | Cs, H | 3.14 | 1.11 |
| Example 2-2 | MRT | 8-membered ring | Cs, H | 1.05 | 1.09 |
| Example 2-3 | MRT | 8-membered ring | Cs, H | 1.09 | 1.21 |
| Comparative Example 1 | CHA | 8-membered ring | H | 1.64 | 0.36 |
| Comparative Example 2 | CHA | 8-membered ring | Cu, H | 2.50 | 0.96 |
| Comparative Example 3 | CHA | 8-membered ring | Cs, H | 2.85 | 0.25 |

The exhaust gas purifying catalyst composition containing the hydrocarbon adsorbent containing the MRT-type zeolite, which was a small-pore zeolite, in each of Examples 1, 1-2 to 1-7, 2, 2-2, and 2-3 was able to adsorb propylene at a relatively low temperature of 50° C., to store the propylene up to a temperature of 300° C. or higher, and to desorb hydrocarbons from the hydrocarbon adsorbent at a relatively high temperature of 300° C. or higher.

Although the CHA-type zeolite in each of Comparative Examples 1 and 3 was a small-pore zeolite having a framework in which the largest pore was an oxygen 8-membered ring, it had a total desorption amount $ZD_2$ of propylene desorbed at 300° C. or higher and 500° C. or lower being 0.5 mmol/g or less, and was thus unable to store the propylene up to a temperature of 300° C. or higher at which the catalyst was sufficiently activated. Although the CHA-type zeolite in Comparative Example 2 was a small-pore zeolite having a framework in which the largest pore was an oxygen 8-membered ring, it had a total desorption amount $ZD_2$ of propylene desorbed at 300° C. or higher and 500° C. or lower being 1.0 mmol/g or less, and was thus unable to store the amount of the propylene as in Examples 1 and 2 up to a temperature of 300° C. or higher.

The hydrocarbon adsorbent using the MRT-type zeolite containing Cu in each of Examples 1 and 1-2 to 1-7 was able to store propylene up to a high temperature of 380° C. to 400° C., to store the propylene adsorbed in a cold-start state up to a temperature of 300° C. or higher at which the catalyst was sufficiently activated, and to desorb the stored propylene, followed by catalytically oxidizing and converting into water and carbon dioxide for purification, thereby improving the purification performance. The hydrocarbon adsorbent in each of Examples 1 and 1-2 to 1-7 had a desorption amount ratio ($ZD_2/ZD_1$) of 0.5 or more, and the MRT-type zeolite containing Cu that was contained in the hydrocarbon adsorbent was able to retain more propylene at a high temperature of, for example, 300° C. or higher. In addition, the MRT-type zeolite used in the hydrocarbon adsorbent in each of Examples 1 and 1-2 to 1-7 had a $SiO_2/Al_2O_3$ ratio of 13 to 15, had a stable crystal structure, and sufficiently contained Al forming a Bronsted acid point, which was an active point for oxidation of hydrocarbons (HC), thereby improving the purification performance of hydrocarbons even after desorbing the propylene. In general, it has been known that the desorption temperature of hydrocarbons can be increased by containing a transition metal in zeolite. Therefore, as for the

TABLE 2

| | Framework structure | Largest pore | Contained element | Molar ratio of $SiO_2/Al_2O_3$ | Molar ratio of Cu/Al | Molar ratio of Cs/Al | Propylene retention temperature (° C.) | Desorption amount ratio $ZD_2/ZD_1$ |
|---|---|---|---|---|---|---|---|---|
| Example 1 | MRT | 8-membered ring | Cu, Cs | 13 | 0.06 | 0.05 | 380 to 400 | 1.43 |
| Example 1-2 | MRT | 8-membered ring | Cu, Cs | 13 | 0.13 | 0.08 | 380 to 400 | 2.39 |
| Example 1-3 | MRT | 8-membered ring | Cu, Cs | 13 | 0.15 | 0.09 | 380 to 400 | 2.74 |
| Example 1-4 | MRT | 8-membered ring | Cu, Cs | 13 | 0.17 | 0.09 | 380 to 400 | 3.06 |
| Example 1-5 | MRT | 8-membered ring | Cu, Cs | 13 | 0.23 | 0.11 | 380 to 400 | 3.63 |
| Example 1-6 | MRT | 8-membered ring | Cu, Cs | 14 | 0.18 | 0.03 | 380 to 400 | 2.64 |
| Example 1-7 | MRT | 8-membered ring | Cu | 15 | 0.13 | 0 | 380 to 400 | 2.65 |
| Comparative Example 2 | CHA | 8-membered ring | Cu, H | 10 | 0.3 | — | 290 to 300 | 0.39 |

Cu-containing zeolite, it is considered that the desorption temperature of hydrocarbons tends to increase as the Cu content ratio is increased (as the molar ratio of Cu/Al is increased). Table 2 shows that, even though the MRT-type zeolite in Example 1 has a small molar ratio of Cu/Al being 0.06, it has a significantly larger desorption amount ratio ($ZD_2/ZD_1$) compared with the CHA-type zeolite in Comparative Example 2 having a large molar ratio of Cu/Al being 0.3. When the molar ratio of Cu/Al in the CHA-type zeolite is controlled in the small range of approximately 0.06 as in Example 1, the desorption amount ratio ($ZD_2/ZD_1$) is considered to be smaller than the value of Comparative Example 2 in Table 2. From the above, it was confirmed that the hydrocarbon adsorbent using the MRT-type zeolite containing Cu was able to retain more propylene at a high temperature of, for example, 300° C. or higher.

The hydrocarbon adsorbents containing the MRT-type zeolite containing Cu and Cs in Example 1 was able to store the adsorbed propylene up to a high temperature of higher than 380° C., whereas the hydrocarbon adsorbent using the CHA-type zeolite containing Cu in Comparative Example 2 stored the adsorbed propylene only to a low temperature of 300° C. or lower.

was unable to store the propylene up to a temperature at which the catalyst was sufficiently activated.

The hydrocarbon adsorbent containing the MRT-type zeolite containing Cs in Example 2 was able to store the adsorbed propylene up to a high temperature of higher than 280° C., whereas the CHA-type zeolite containing Cs in Comparative Example 3 stored the adsorbed propylene only to a low temperature of 280° C. or lower.

The BEA-type zeolite in Comparative Example 4 and the MFI-type zeolite in Comparative Example 5 stored propylene adsorbed at a relatively low temperature of 50° C. only to a relatively low temperature of 250° C. or lower, and were unable to store the propylene up to a temperature at which the catalyst was sufficiently activated. In addition, the BEA-type zeolite in Comparative Example 4 and the MFI-type zeolite in Comparative Example 5 had a large molar ratio of $SiO_2/Al_2O_3$ of more than 20, and had less amount of Al forming a Bronsted acid point as the active point of oxidation of hydrocarbons (HC), which might be inferior in the purification performance of the desorbed hydrocarbons.

TABLE 3

| | Framework structure | Largest pore | Contained element | Molar ratio of $SiO_2/Al_2O_3$ | Molar ratio of Cu/Al | Molar ratio of Cs/Al | Propylene retention temperature (° C.) | Desorption amount ratio $ZD_2/ZD_1$ |
|---|---|---|---|---|---|---|---|---|
| Example 2 | MRT | 8-membered ring | Cs, H | 13 | — | 0.28 | 280 to 300 | 0.35 |
| Example 2-2 | MRT | 8-membered ring | Cs, H | 14 | — | 0.08 | 280 to 300 | 1.04 |
| Example 2-3 | MRT | 8-membered ring | Cs, H | 15 | — | 0.03 | 280 to 300 | 1.11 |
| Comparative Example 1 | CHA | 8-membered ring | H | 10 | — | — | 250 | 0.22 |
| Comparative Example 3 | CHA | 8-membered ring | Cs, H | 10 | — | 0.07 | 250 to 280 | 0.09 |
| Comparative Example 4 | BEA | 12-membered ring | H | 30 | — | — | 200 | 0.02 |
| Comparative Example 5 | MFI | 10-membered ring | H | 30 | — | — | 250 | 0.29 |

The hydrocarbon adsorbent containing the MRT-type zeolite in each of Examples 2, 2-2, and 2-3 was able to adsorb propylene at a relatively low temperature of 50° C., and to store the propylene up to a high temperature of 280° C. to 300° C. The exhaust gas purifying catalyst composition containing the hydrocarbon adsorbent containing the MRT-type zeolite in each of Examples 2, 2-2, and 2-3 was able to store propylene adsorbed in a cold-start state up to a temperature at which the catalyst was sufficiently activated, and to desorb the stored propylene, followed by catalytically oxidizing and converting into water and carbon dioxide for purification, thereby improving the purification performance. The hydrocarbon adsorbent in each of Examples 2, 2-2, and 2-3 had a desorption amount ratio ($ZD_2/ZD_1$) of 0.3 or more, and the MRT-type zeolite containing no Cu that was contained in the hydrocarbon adsorbent was able to retain more propylene at a high temperature of, for example, 300° C. or higher. In addition, the MRT-type zeolite used in the hydrocarbon adsorbent in each of Examples 2, 2-2, and 2-3 had a molar ratio of $SiO_2/Al_2O_3$ of 13 to 15, and sufficiently contained Al forming a Bronsted acid point, which was an active point for oxidation of hydrocarbons (HC), thereby improving the purification performance of hydrocarbons even after desorbing the propylene.

The CHA-type zeolite in Comparative Example 1 stored propylene adsorbed at a relatively low temperature of 50° C. only to a relatively low temperature of 250° C. or lower, and Example 3

SCR Catalyst

Twenty (20) g of the hydrocarbon adsorbent in Example 1, 12 g of alumina, and 50 g of alumina sol (solid content concentration of 15%) were mixed with 20 g of pure water to form a slurry.

Measurement of Selective Catalytic Reduction (SCR) Activity

The slurry obtained in Example 3 was coated on a cordierite honeycomb having a size of φ25.4 mm×L40 mm so as to be 2.03 g of alumina and 2.03 g of zeolite, dried at 100° C. for 30 minutes, and then calcined at 500° C. for 1 hour to obtain an exhaust gas purifying catalyst as a measurement sample. This measurement sample was filled in a quartz atmospheric pressure fixed-bed flow-type reaction tube. Using an engine exhaust gas measurement apparatus (MEXA-ONE (detector: MEXA-ONE D1, MEXA-ONE FT), manufactured by HORIBA Ltd.), the temperature was raised from 100° C. to 600° C. under the temperature rising condition of 20° C./min while circulating a gas having the following composition under the condition of SV: 75,000 $h^{-1}$, and the purification rates of NO and $NO_2$ generated from NO were measured at each temperature.

Gas Composition

NO: 180 ppm by volume, $NH_3$: 180 ppm by volume, $CO_2$: 10% by volume, $O_2$: 6% by volume, $H_2O$: 7% by volume, and $N_2$: balance (% by volume)

FIG. 1 is a graph showing the relationship between the temperatures and the NO/NOx purification rates of the exhaust gas purifying catalyst in Example 3. As shown in FIG. 1, the exhaust gas purifying catalyst in Example 3 had a high NO/NOx purification rate of 50% or more at a temperature of higher than 400° C.

INDUSTRIAL APPLICABILITY

The hydrocarbon adsorbent according to the present disclosure is capable of adsorbing hydrocarbons, storing the adsorbed hydrocarbons up to a relatively high temperature, and desorbing the adsorbed and stored hydrocarbons at a relatively high temperature at which the catalyst can be activated, thereby improving the exhaust gas purification performance. The hydrocarbon adsorbent according to the present disclosure can be used in the exhaust gas purifying catalyst composition, the exhaust gas purifying catalyst, and the method for treating an exhaust gas.

The invention claimed is:

1. A hydrocarbon adsorbent, comprising a zeolite having an MRT-type framework structure,
wherein the zeolite comprising at least one metal element M selected from the group consisting of copper, titanium, vanadium, chromium, manganese, iron, cobalt, zirconium, niobium, technetium, ruthenium, calcium, strontium, barium, lithium, potassium and rubidium, and
a content ratio of the metal element M contained in the zeolite is 0.3% by mass or more and 10% by mass or less.

2. The hydrocarbon adsorbent according to claim 1, wherein the zeolite comprises at least one element selected from the group consisting of manganese, iron, cobalt, copper, potassium, and rubidium.

3. The hydrocarbon adsorbent according to claim 1, comprising a small-pore zeolite having a total desorption amount $ZD_1$ of propylene desorbed at 50° C. or higher and lower than 300° C. being 3.5 mmol/g or less and a total desorption amount $ZD_2$ of propylene desorbed at 300° C. or higher and 500° C. or lower being 0.5 mmol/g or more, per 1 g by mass of the small-pore zeolite, when adsorbing propylene at 50° C. and then heating from 50° C. to 500° C. under the condition of 10° C./min by a temperature-programmed desorption method.

4. A hydrocarbon adsorbent, comprising a Cu-containing zeolite having a ratio ($ZD_2/ZD_1$) of a total desorption amount $ZD_2$ of propylene desorbed at 300° C. or higher and 500° C. or lower to a total desorption amount $ZD_1$ of propylene desorbed at 50° C. or higher and lower than 300° C., per 1 g by mass of the Cu-containing zeolite that contains copper, being 0.5 or more, when adsorbing propylene at 50° C. and then heating from 50° C. to 500° C. under the condition of 10° C./min by a temperature-programmed desorption method.

5. A hydrocarbon adsorbent, comprising a Cu-free zeolite having a ratio ($ZD_2/ZD_1$) of a total desorption amount $ZD_2$ of propylene desorbed at 300° C. or higher and 500° C. or lower to a total desorption amount $ZD_1$ of propylene desorbed at 50° C. or higher and lower than 300° C., per 1 g by mass of the Cu-free zeolite that contains no copper, being 0.3 or more, when adsorbing propylene at 50° C. and then heating from 50° C. to 500° C. under the condition of 10° C./min by a temperature-programmed desorption method.

6. An exhaust gas purifying catalyst composition, comprising the hydrocarbon adsorbent according to claim 1.

7. An exhaust gas purifying catalyst, comprising a substrate and a layer containing the exhaust gas purifying catalyst composition according to claim 6 provided on the substrate.

8. A method for treating an exhaust gas, comprising bringing a combustion exhaust gas containing hydrocarbons into contact with the exhaust gas purifying catalyst according to claim 7 to adsorb the hydrocarbons to the exhaust gas purifying catalyst, and then desorbing the hydrocarbons from the exhaust gas purifying catalyst at a temperature of 300° C. or higher.

9. A method for treating an exhaust gas, comprising bringing a combustion exhaust gas containing NOx and/or $NH_3$ into contact with the exhaust gas purifying catalyst according to claim 7 to selectively reduce at least a portion of NOx to $N_2$ and $H_2O$, and/or to oxidize at least a portion of $NH_3$.

10. An exhaust gas purifying catalyst composition, comprising the hydrocarbon adsorbent according to claim 4.

11. An exhaust gas purifying catalyst, comprising a substrate and a layer containing the exhaust gas purifying catalyst composition according to claim 10 provided on the substrate.

12. A method for treating an exhaust gas, comprising bringing a combustion exhaust gas containing hydrocarbons into contact with the exhaust gas purifying catalyst according to claim 11 to adsorb the hydrocarbons to the exhaust gas purifying catalyst, and then desorbing the hydrocarbons from the exhaust gas purifying catalyst at a temperature of 300° C. or higher.

13. A method for treating an exhaust gas, comprising bringing a combustion exhaust gas containing NOx and/or $NH_3$ into contact with the exhaust gas purifying catalyst according to claim 11 to selectively reduce at least a portion of NOx to $N_2$ and $H_2O$, and/or to oxidize at least a portion of $NH_3$.

14. An exhaust gas purifying catalyst composition, comprising the hydrocarbon adsorbent according to claim 5.

15. An exhaust gas purifying catalyst, comprising a substrate and a layer containing the exhaust gas purifying catalyst composition according to claim 14 provided on the substrate.

16. A method for treating an exhaust gas, comprising bringing a combustion exhaust gas containing hydrocarbons into contact with the exhaust gas purifying catalyst according to claim 15 to adsorb the hydrocarbons to the exhaust gas purifying catalyst, and then desorbing the hydrocarbons from the exhaust gas purifying catalyst at a temperature of 300° C. or higher.

17. A method for treating an exhaust gas, comprising bringing a combustion exhaust gas containing NOx and/or $NH_3$ into contact with the exhaust gas purifying catalyst according to claim 15 to selectively reduce at least a portion of NOx to $N_2$ and $H_2O$, and/or to oxidize at least a portion of $NH_3$.

* * * * *